(12) United States Patent
Balmer

(10) Patent No.: US 6,406,043 B1
(45) Date of Patent: Jun. 18, 2002

(54) SUSPENSION AND STEERING SYSTEM FOR A VEHICLE

(76) Inventor: Charles Balmer, Box 100, Elie, Manitoba (CA), R0H 0H0

( * ) Notice: Subject to any disclaimer, the term of this patent is extended or adjusted under 35 U.S.C. 154(b) by 0 days.

(21) Appl. No.: 09/365,253

(22) Filed: Jul. 30, 1999

Related U.S. Application Data

(63) Continuation-in-part of application No. 09/020,579, filed on Jan. 29, 1998, now abandoned.

(51) Int. Cl.[7] .............................. B60G 7/00; B60P 7/00; B62D 7/00; B62D 5/00; B62D 5/06; B60B 35/00
(52) U.S. Cl. ........................... 280/124.1; 280/124.157; 180/403; 301/128
(58) Field of Search ....................... 280/124.1, 124.134, 280/124.135, 124.136, 124.157, 6.154; 180/905, 906, 403, 417; 301/128

(56) References Cited

U.S. PATENT DOCUMENTS

| | | | | |
|---|---|---|---|---|
| 2,455,429 A | * | 12/1948 | Lucien | 296/28 |
| 2,696,388 A | * | 12/1954 | Kishline et al. | 280/106.5 |
| 2,941,817 A | * | 6/1960 | Benson | 280/124 |
| 3,042,422 A | | 7/1962 | Garnett | |
| 3,154,164 A | * | 10/1964 | Shaw et al. | 180/906 |
| 3,273,912 A | * | 9/1966 | Crockett | 280/124.111 |
| 3,414,072 A | * | 12/1968 | Hodges, Jr. et al. | 180/24 |
| 3,414,287 A | * | 12/1968 | Weiertz | 280/96.2 |
| 3,426,720 A | * | 2/1969 | Enos | 180/244 |
| 3,524,514 A | * | 8/1970 | Kratzke | 180/420 |
| 3,635,302 A | * | 1/1972 | Rogers et al. | 180/233 |
| 3,704,898 A | * | 12/1972 | Schmidt | 280/124.157 |
| 3,729,210 A | * | 4/1973 | Cunningham, Jr. | 280/112 A |
| 3,782,491 A | * | 1/1974 | Herbenar | 180/79.2 R |
| 3,804,189 A | | 4/1974 | Smith | |
| 3,829,118 A | | 8/1974 | Gouirand | |
| 3,896,617 A | * | 7/1975 | Kraina | 180/79.2 R |
| 4,079,955 A | * | 3/1978 | Thorpe et al. | 280/472 |
| 4,161,865 A | * | 7/1979 | Day | 180/152 |
| 4,186,815 A | * | 2/1980 | Hart | 180/41 |
| 4,223,904 A | * | 9/1980 | McColl | 280/104 |
| 4,241,803 A | * | 12/1980 | Lauber | 180/8.1 |
| 4,313,619 A | | 2/1982 | Hailer | |
| 4,353,572 A | * | 10/1982 | McCain | 280/492 |
| 4,379,572 A | * | 4/1983 | Hedenberg | 280/711 |
| 4,423,886 A | * | 1/1984 | Taylor | 280/496 |
| 4,444,409 A | * | 4/1984 | Garrison | 280/492 |
| 4,534,575 A | * | 8/1985 | Grove et al. | 280/6.11 |
| 4,802,690 A | * | 2/1989 | Raidel | 280/713 |
| 4,878,691 A | * | 11/1989 | Cooper et al. | 280/189 |
| 5,039,129 A | * | 8/1991 | Balmer | 180/906 |

(List continued on next page.)

Primary Examiner—Brian L. Johnson
Assistant Examiner—Joselynn Y. Sliteris
(74) Attorney, Agent, or Firm—Adrian D. Battison

(57) ABSTRACT

A steering and suspension arrangement for agricultural vehicle includes a horizontal axle transverse to the direction of movement with the ground wheel mounted at each end of the axle. The length of the axle can be adjusted by extending and retracting end portions of the axle relative to a centre section of the axle. Each end of the axle carries a wheel hub on a suspension arrangement defined by an upper plate, a lower plate, a first channel member attached to the lower plate and a second channel member attached to the upper plate with the channel members facing each other and connected by two parallel pivoting links. Between the plates is mounted a gas bag spring. The frame is divided into a front portion and a rear portion which are held against steering movement but can pivot, each relative to the other about a horizontal axis along the direction of travel to accommodate twisting beyond the limited suspension movement. The steering is effected by steering movements of the front wheels controlled by two separate cylinders which are arranged in a hydraulic circuit which automatically compensates for any fluid leakage to maintain the wheels aligned.

18 Claims, 7 Drawing Sheets

U.S. PATENT DOCUMENTS

| | | | | |
|---|---|---|---|---|
| 5,085,457 | A | * | 2/1992 | Young .......................... 280/693 |
| 5,121,808 | A | * | 6/1992 | Visentini et al. ............. 180/906 |
| 5,346,247 | A | * | 9/1994 | Snyder ........................ 280/712 |
| 5,353,988 | A | | 10/1994 | Gallenberg |
| 5,364,113 | A | | 11/1994 | Goertzen |
| 5,403,031 | A | * | 4/1995 | Gottschalk et al. .......... 280/704 |
| 5,580,089 | A | * | 12/1996 | Kolka ................. 280/124.103 |
| 5,597,172 | A | | 1/1997 | Maiwald et al. |
| 5,649,719 | A | * | 7/1997 | Wallace et al. .............. 280/713 |
| 5,755,382 | A | * | 5/1998 | Skotinkov .................... 180/411 |
| 5,778,569 | A | * | 7/1998 | Schaeff ........................ 280/111 |
| 5,785,345 | A | * | 7/1998 | Barlas et al. ................ 280/715 |
| 5,791,681 | A | * | 8/1998 | VanDenberg ................ 280/713 |
| 5,806,870 | A | * | 9/1998 | Hull et al. ................... 280/400 |
| 6,070,691 | A | * | 6/2000 | Evans ......................... 180/433 |
| 6,142,494 | A | * | 11/2000 | Higuchi ................... 280/93.51 |
| 6,145,855 | A | * | 11/2000 | Bellis, Jr. ................... 280/32.7 |
| 6,173,978 | B1 | * | 1/2001 | Wagner ............... 280/124.128 |

* cited by examiner

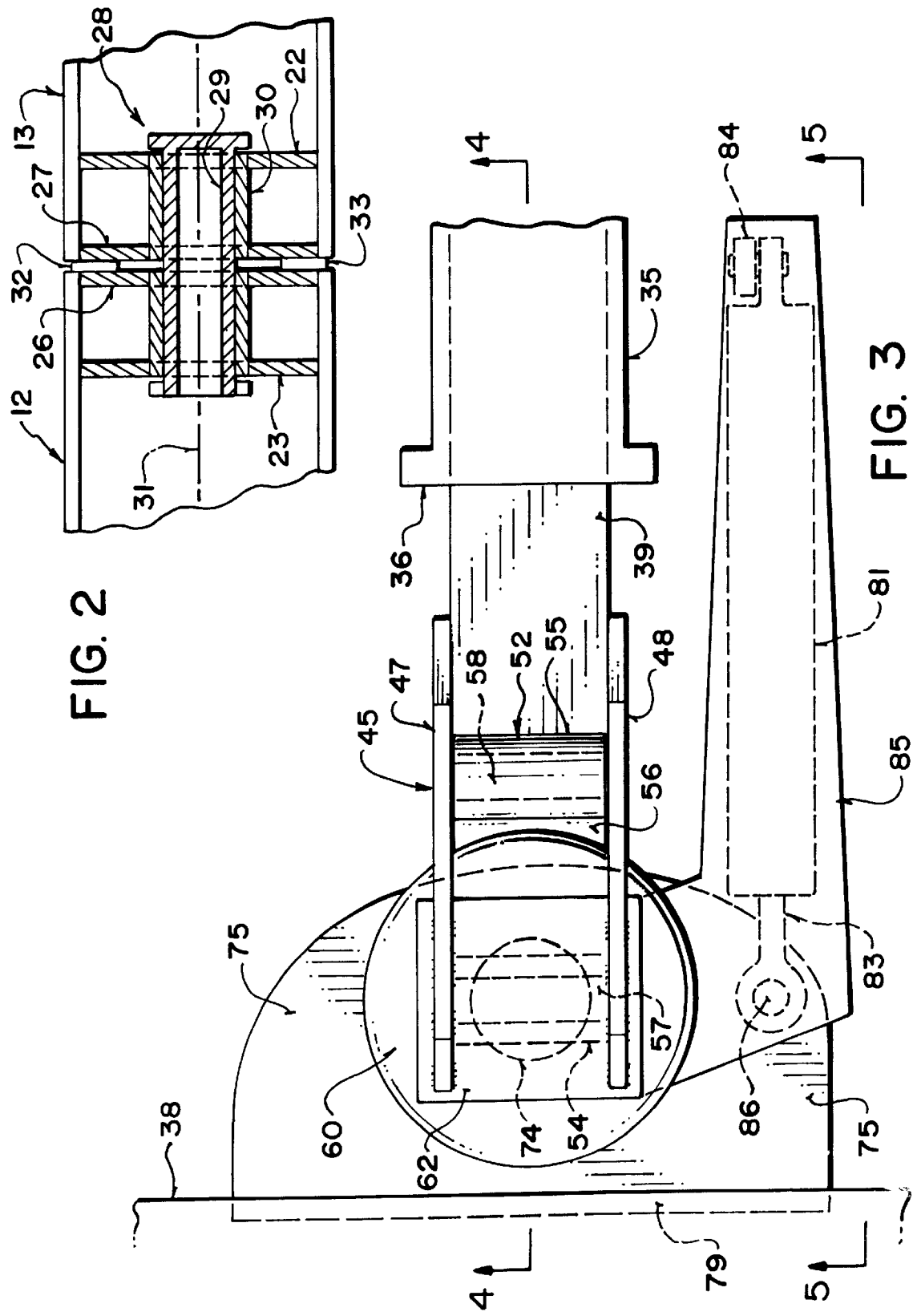

SUSPENSION AND STEERING SYSTEM FOR A VEHICLE

This application is a continuation in part application of Application Ser. No. 09/020,579 filed Jan. 29th 1998 and now abandoned.

This invention relates to a vehicle and particularly to a suspension and steering system for an agricultural type vehicle by which the ground wheels of the vehicle can be attached through an axle to the frame structure for supporting the frame structure in movement across the ground.

BACKGROUND OF THE INVENTION

In recent years attention has been given to development of high clearance agricultural vehicles for movement across the ground for transporting materials to be applied to the ground either in granular or liquid form. Developments in the types of materials to be applied have required that the vehicles be capable of movement over bare ground prior to seeding and also over the ground when the crop has emerged and yet further when the crop is well developed. These requirements have led to the development of vehicles specially arranged for these purposes which generally include relatively large ground wheels and raised axles so that the axle can pass over the top of the crop when partly or fully grown. In order to enable the vehicle to move across the ground at relatively high speed, suspension systems are necessary between the ground wheels and the axle to allow suspension movement of the ground wheels to accommodate changes in ground level. In addition it is necessary for the spacing between the ground wheels to be adjustable to allow the ground wheels to pass between the rows of a row crop and to accommodate different spacing of the row crop. These requirements have required special developments in the suspension systems and various techniques have been developed to overcome these problems associated with providing these requirements.

One example of a suspension system for a vehicle of this type is shown in U.S. Pat. No. 5,039,129 of the present inventor. This product is used on a sprayer manufactured and sold widely by Willmar Manufacturing Inc.

John Deere in their U.S. Pat. No. 5,597,172 issued Jan. 28th 1997 disclose a suspension system which they have released commercially on a sprayer. This system uses for each of the four wheels of the vehicle a suspension including a sliding cylindrical strut mounted in a sleeve connected to the axle. A gas bag spring is mounted at the top of the strut. Control of the angular orientation of the strut in the sleeve for steering and attitude control is effected by a scissors linkage connected between the strut and the sleeve. This arrangement is disadvantageous because:

a) It requires sliding movement between the sleeve and the strut which is guided by bushings. In the agricultural situation which requires a high level of movement and requires this to be done in the presence of dust and other contamination, the bushings will receive a high level of wear.

b) The scissors linkage is complex and expensive.

c) The positioning of the gas bag spring at the top of the strut places it high on the machine with the consequent interference with proper view of the ground.

In U.S. Pat. No. 5,353,988 (Gallenberg) issued Oct. 11th 1994 is shown a further suspension arrangement for a sprayer using cross axle beams pivotally connected to the frame with gas bag springs connecting the beams to the frame.

Other examples of suspensions for various types of vehicle using gas bag springs and sliding struts are shown in U.S. Pat. No. 5,364,113 (Goertzen) issued Nov. 15th 1994; U.S. Pat. No. 3,829,118 (Gouirand) issued Aug. 13th 1974, U.S. Pat. No. 3,804,189 (Smith) issued Apr. 16th 1974 and U.S. Pat. No. 3,042,422 (Garnett) issued Jul. 3rd 1962.

SUMMARY OF THE INVENTION

It is one object of the present invention to provide an improved suspension system for an agricultural vehicle.

According to one aspect of the invention there is provided an agricultural vehicle for moving over agricultural terrain comprising:

a vehicle frame structure for supporting elements to be transported;

a pair of ground wheels each having a wheel hub mounted on a respective side of the frame structure for rotation of the ground wheel about the wheel hub for transporting the frame structure across the ground in a direction of travel;

two suspension assemblies each for supporting a respective side of the frame structure on a respective one of the wheel hubs for suspension movement of the frame structure in a suspension direction generally upwardly and downwardly relative to the respective hub in response to changes in ground level;

each suspension assembly comprising:

a first member carried on the respective side of the frame structure;

a second member rigidly attached to the respective hub;

a pair of pivotal links interconnecting the first and second members to allow up and down suspension movement of the second member relative to the first member;

and a spring connected between the first and second member so as to generate a spring bias in a direction along the suspension direction to support the respective side of the frame structure on the respective hub.

Preferably the spring is a gas bag.

Preferably the pivotal links generate sideways movement of the first member relative to the second member and wherein the gas bag is arranged to accommodate the sideways movement by sideways flexing of the bag.

Preferably each of the first and second members carries a substantially horizontal platform with the gas bag spring located between the platforms.

Preferably the links are pivotal from a raised position of the wheel in which the links are inclined outwardly of the first member and upwardly, through a horizontal orientation, to a lowered position of the wheel in which the links are inclined outwardly and downwardly.

Preferably the links are substantially parallel.

Preferably the links are substantially of he same length and arranged such that pivot axes thereof on the first member lie in a common vertical first plane and such that pivot axes thereof on the second member lie in a common vertical second plane parallel to the first plane.

Preferably each of the links is pivotally mounted on each of the first and second members by a mounting assembly and wherein each mounting assembly comprises a horizontal mounting pin at right angles to the link, two parallel mounting walls of the respective one of the first and second members with the mounting walls at right angles to the pin, and a collar on the link carried on the pin, the collar being confined against forward and rearward movement in the direction of travel by the mounting walls.

Preferably the mounting walls are coplanar.

Preferably the mounting walls are defined by front and rear walls of a first channel portion of the first member and front and rear walls of a second channel portion of the second member.

Preferably each link consists of the respective collars and a rod there between.

Preferably the first and second members and the links are arranged such that the suspension movement causes inward and outward movement of the wheel relative to the ground and wherein shock absorption for the suspension movement is generated by said movement of the wheel relative to the ground.

Preferably the first member is mounted on an outer end of an axle forming part of the frame structure.

Preferably the axle is extendible to increase and decrease the spacing between the wheels.

Preferably one platform is mounted on top of the second member and wherein the second platform is mounted on the bottom of an arch portion extending from the first member over the top of the second member.

Preferably the wheel is mounted for steering movement about a substantially vertical axis relative to the second member on a steering hub carried on the second member below the links.

Preferably steering movement is effected by a hydraulic cylinder connected between an arm attached to the second member and an arm attached to the wheel hub.

Preferably each of the platforms projects to one side of the first and second members such that the platform on the first member is located above the other to receive the gas bag therebetween.

Preferably the frame structure includes a front frame portion and a rear frame portion, each of the frame portions being substantially rigid and the frame portions being connected so as to be maintained aligned in the direction of travel and so as to prevent steering pivotal movement between the frame portions about a vertical axis;

a front axle mounted on the front frame portion and extending across the frame structure;

a rear axle mounted on the rear frame portion and extending across the frame structure rearwardly of the front axle;

each of the front and rear axles having a pair of ground wheels thereon, each ground wheel having a wheel hub mounted at a respective end of the axle on a respective side of the frame structure for rotation of a wheel about the wheel hub for transporting the frame structure across the ground;

the ground wheels of at least the front frame portion being steerable relative to the front frame portion;

the front and rear frame portions being mounted for pivotal movement each relative to the other about an axis longitudinal of the direction of travel;

and four suspension assemblies each arranged to mount one of the ground wheels on a respective end of a respective one of the axles and each arranged to allow suspension movement of the axle in a suspension direction generally upwardly and downwardly relative to the respective ground wheel in response to changes in ground level.

Preferably the vehicle includes an engine and a cab mounted wholly on the front frame portion and includes a load mounted wholly on the rear frame portion.

Preferably there is provided a limit stop for limiting said pivotal movement of said frame portions.

It is a further object of the present invention to provide an improved steering system for a vehicle which uses two matching hydraulic cylinders to effect steering movements of the two steered wheels in which leakage of fluid across the pistons of the cylinders is automatically compensated.

According to a second aspect of the invention there is provided an agricultural vehicle for moving over agricultural terrain comprising:

a vehicle frame structure for supporting elements to be transported;

a pair of ground wheels each having a wheel hub mounted on a respective side of the frame structure for rotation of the ground wheel about the wheel hub for transporting the frame structure across the ground in a direction of travel;

each wheel hub being carried on a respective one of two first mounting members for pivotal steering movement relative thereto about a substantially vertical steering axis;

each first mounting member including a respective one of two double acting hydraulic cylinders each extending between a mounting point on the mounting member and a mounting point on the hub such that extension and retraction of a piston in the cylinder between two end positions of the piston causes movement of the wheel hub between two extreme steering positions thereof;

and a control system for supplying hydraulic fluid to the cylinders for effecting synchronised steering movement of the wheel hubs to effect steering of the vehicle, the control system including:

a source of hydraulic fluid;

a valve operable to selectively direct fluid from the source into a left turn duct and a right turn duct, the valve being operable in response to manual input of a required turning direction;

the left turn duct being connected to one end of one of the cylinders such that supply of fluid thereto at a required steering pressure causes actuation of the cylinder to effect turning of the respective wheel in a direction to effect steering to the left;

the right turn duct being connected to one end of the other of the cylinders such that supply of fluid thereto at a required steering pressure causes actuation of the cylinder to effect turning of the respective wheel in a direction to effect steering to the right;

an interconnection duct connecting fluid between the other end of said one cylinder and the other end of said other cylinder such that actuation of said one cylinder to effect turning of the respective wheel in a direction to effect steering to the left causes communication of fluid to the other cylinder to effect turning of the respective wheel in a direction to effect steering to the left and such that actuation of said other cylinder to effect turning of the respective wheel in a direction to effect steering to the right causes communication of fluid to said one cylinder to effect turning of the respective wheel in a direction to effect steering to the right;

a first compensation duct including a first pressure relief valve arranged between the interconnection duct and a high pressure point;

a second compensation duct including a second pressure relief valve arranged between the interconnection duct and a low pressure point;

each of the first and second pressure relief valves being arranged to prevent flow of fluid in one direction and to allow flow of fluid in the opposed direction when a pressure difference there across exceeds a predetermined pressure greater than the required steering pressure and less than a maximum operating pressure of the source;

such that, when one cylinder reaches one of its end positions before the other cylinder reaches its respective end position, fluid is caused to flow between the interconnection duct and one of the high pressure point and the low pressure thereby automatically re-aligning the wheels to accommodate any leakage of fluid across the pistons.

BRIEF DESCRIPTION OF THE DRAWINGS

One embodiment of the invention will now be described in conjunction with the accompanying drawings in which:

FIG. 2 is a cross sectional view along the lines 2—2 of FIG. 1.

FIG. 3 is a top plan view of one front suspension assembly of the vehicle of FIG. 1.

In the drawings like characters of reference indicate corresponding parts in the different figures.

DETAILED DESCRIPTION

Figure 1:
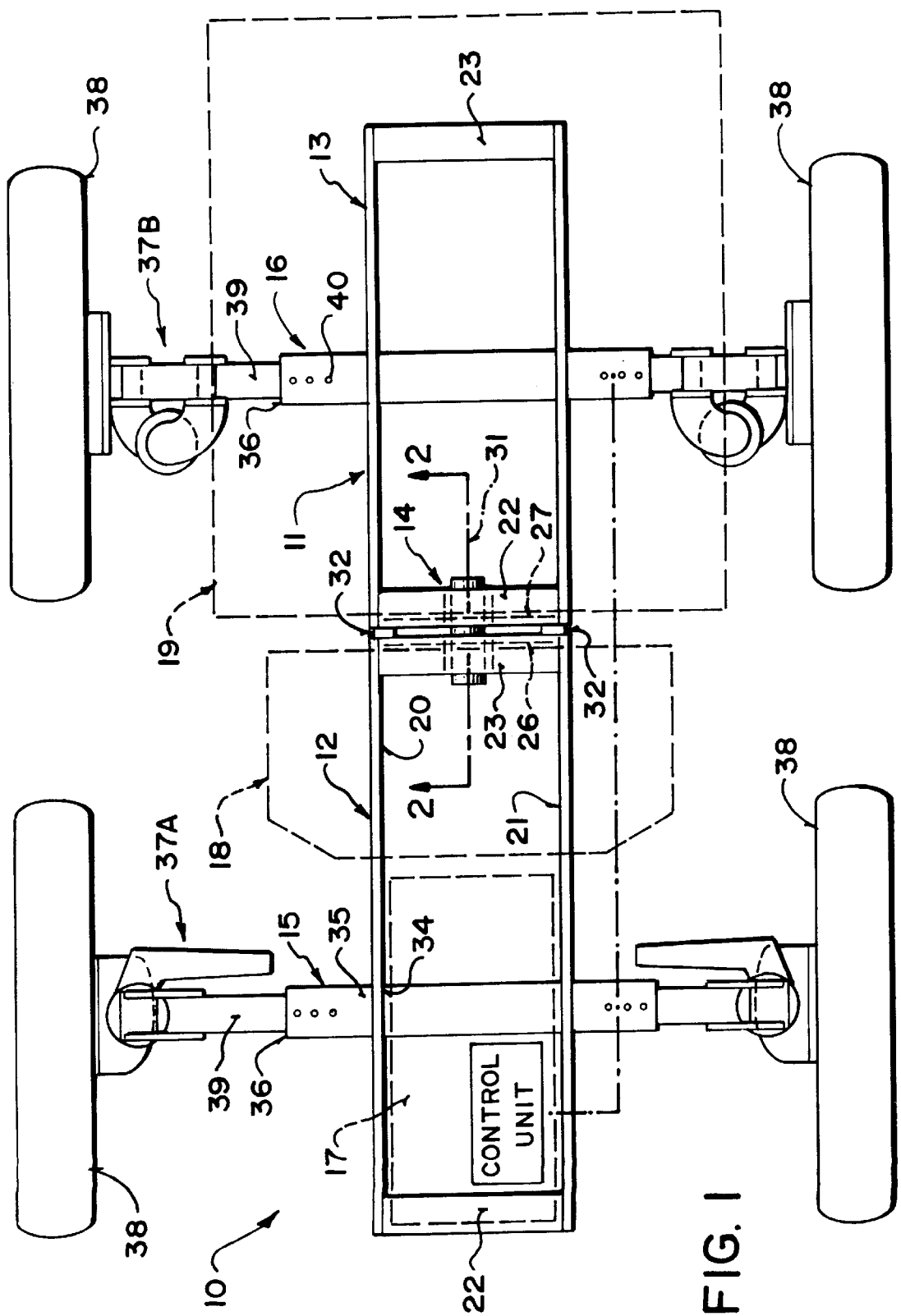
FIG. 1 is a top plan view of the frame, axle and suspension system of an agricultural vehicle according to the present invention, the engine, cab and load being shown in dash line.

A vehicle according to the present invention is shown in FIG. 1 and indicated generally at 10. The vehicle includes a frame structure 11 including a front frame portion 12 and a rear frame portion 13. The front frame portion 12 is attached to the rear frame portion 13 at a central coupling 14. The length of the frame portions may vary so that the central coupling may not be exactly at the center as defined between the two ends. Each of the frame portions carries an axle 15, 16 which are substantially identical as described in detail hereinafter.

The front frame portion carries an engine 17 and a cab 18. The rear frame portion carries a load 19. The engine, cab and load are shown in dash line as schematic illustrations only since these will be well known to one skilled in the art and the design and arrangement can vary. In the example shown, the engine is mounted at the forward end of the frame and the cab is positioned behind the engine so that the driver can see over the engine and see down either side of the engine to observe the position of the vehicle on the ground. Although not shown in detail, the engine includes a transmission driving a hydraulic pump which provides hydraulic fluid under pressure for communication to drive hubs on the wheels and for powering other elements of the vehicle as required by the particular end use to which the vehicle is applied The load 19 is shown only schematically. The vehicle can be used for various different purposes including transportation and spreading of particulate material and transportation and spraying of liquid material. The load 19 will generally therefore include a transportation container together with a boom which is supported at the rear of the vehicle and extends outwardly to each side of the vehicle. The vehicle is not intended as a towing tractor with the majority of the load will be pulled behind the frame but instead is intended that the vehicle provide a platform for propelling a load across the field and a distribution system for that load.

Each of the frame portions comprises a pair of vertical side plates 20 and 21 which are supported by a plurality of cross members including a cross member 22 at the front end and a cross member 23 at the rear end. Each of the side plates includes inturned top and bottom flanges and other stiffening elements (not shown) which act to provide a stiffening effect of the side plates so as to provide sufficient structural rigidity so that the frame portion defined by the side plates and the cross members is rigid to prevent twisting of the frame portion corner to corner. The arrangements and selection of the stiffening elements and the construction of the side plates will be well known to one skilled in the art using conventional engineering techniques.

As shown in FIGS. 1 and 2, the rear cross member 23 of the front frame portion 12 defines a vertical end wall 26 immediately at the end of the frame portion and at the end of the side plates of the front frame portion. Similarly the front cross member 22 defines a vertical end plate 27 at the forward end of the rear frame portion 13. As shown in FIG. 2, these end plates 26 and 27 are mounted closely adjacent in parallel relationship. The plates are mounted by a swivel coupling 28 defined by an inner tubular support 29 and outer collars 30 surrounding the inner tubular support and attached to the end members 22 and 23 respectively. Thus the frame portions are fixed in aligned position in that the end plates 26 and 27 remain in parallel position and cannot twist in a steering action relative to each other about a vertical steering axis. However the end plates and therefore the frame portions are pivotal about a horizontal axis 31 longitudinal of the frame and therefore longitudinal of the direction of travel of the frame across the ground. Thus if one end of the axle 16 is lifted, it can cause rotation of the rear frame portion relative to the front frame portion about the axis 31 without similarly twisting the axle 15. A first stop member 32 on the end plate 26 can engage a second stop member 33 on the end plate 27 so as to limit the amount of rotation of one frame portion relative to the other about the axis 31. The stop members are arranged on both sides of the axis so as to limit rotation in both directions.

In an arrangement where both the front and rear frame sections are similarly loaded, the use of the center pivot ensures that the tendency to roll on turning or other side loads is shared between the two frame sections thus reducing the tendency of the whole vehicle to roll.

The axles 15 and 16 are substantially identical and their mounting on the respective frame portions is also substantially identical. As shown in FIG. 1, each side plate 20, 21 has an opening 34 through which a beam 35 of the axle 15 extends. The beam 35 projects outwardly from each side plate to an end 36 of the beam spaced outwardly of the side plate and inwardly of a suspension assembly 37A of the front axle and a suspension assembly 37B of the rear axle, each suspension assembly including a wheel 38 mounted on the end of the axle.

The axle further includes a pair of extension beams 39 each of which projects outwardly from a respective end 36 of the beam 35. The extension beams 39 can slide inwardly and outwardly of the beam 35 under control of drive cylinders (not shown). The position of the extension beams is locked by a pin in a selected one of a plurality of holes 40. Each of the extension beams 39 is formed by a tube mounted within the beam and extending outwardly beyond the beam to an outer end attached to the respective suspension system 37A, 37B.

Figure 4:
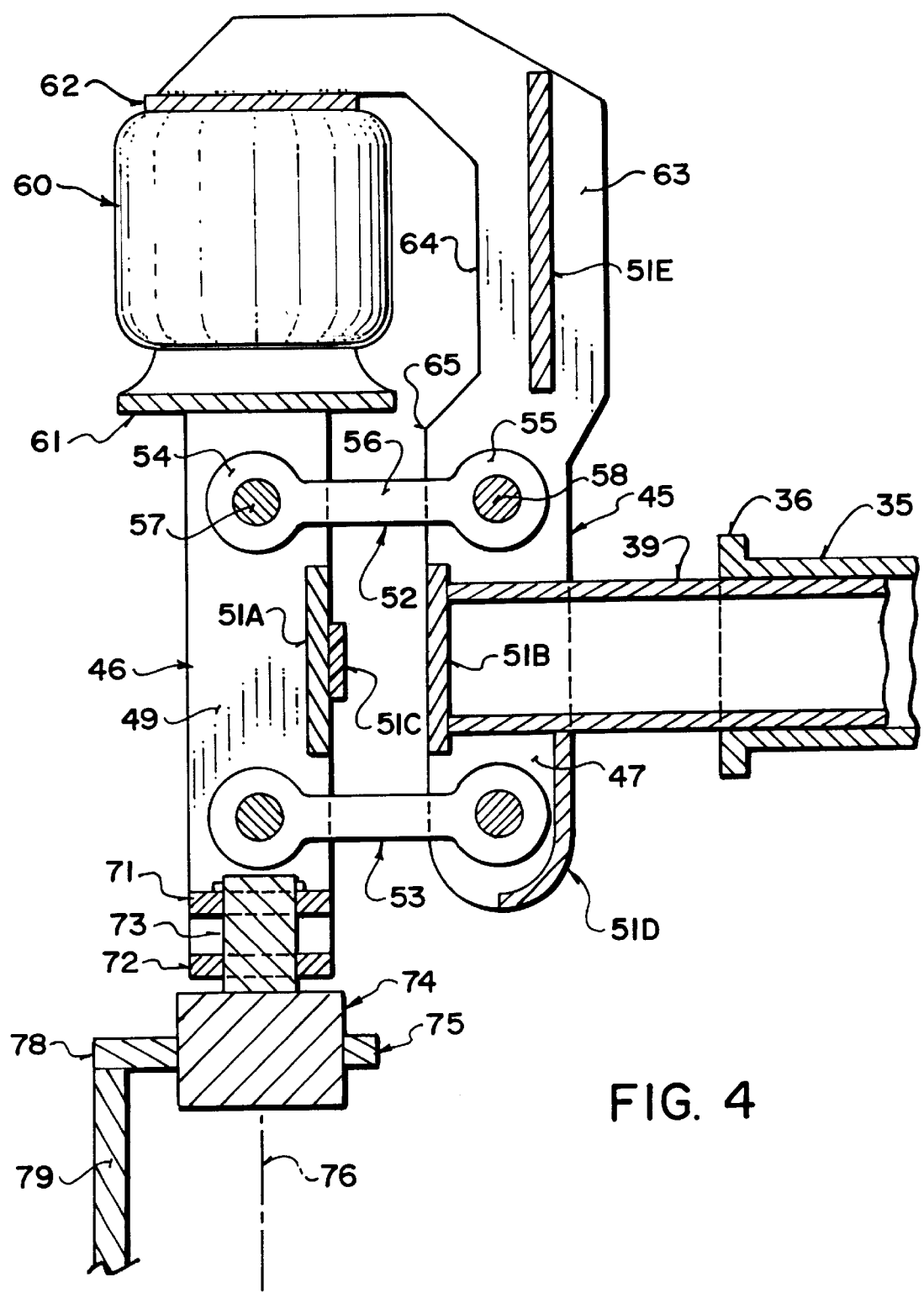
FIG. 4 is a cross sectional view along the lines 4—4 of FIG. 3.
Figure 5:
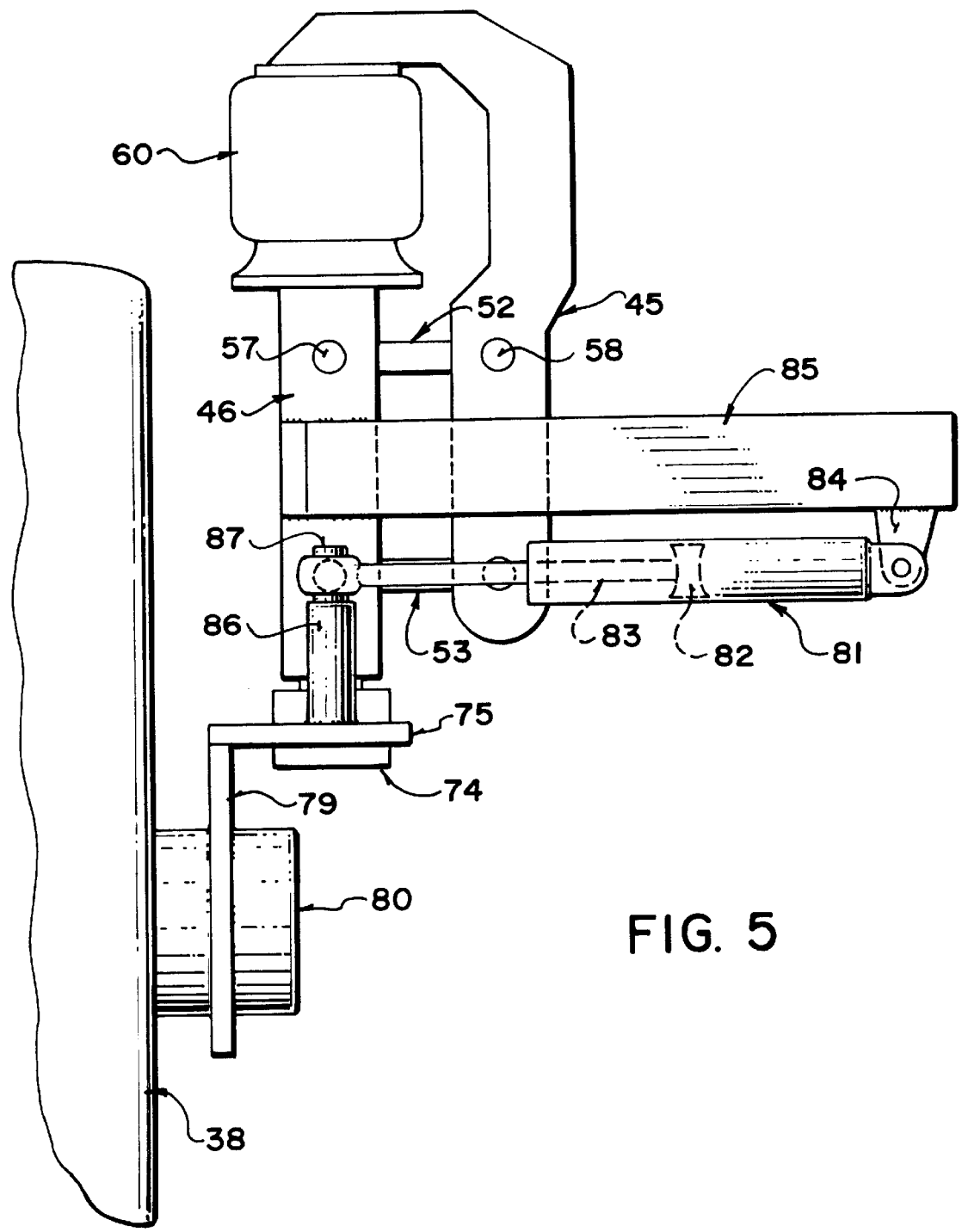
FIG. 5 is a side elevational view along the lines 5—5 of FIG. 3.

The suspension members 37A on the front axle are identical and one of them is shown in FIGS. 3, 4 and 5.

Figure 6:
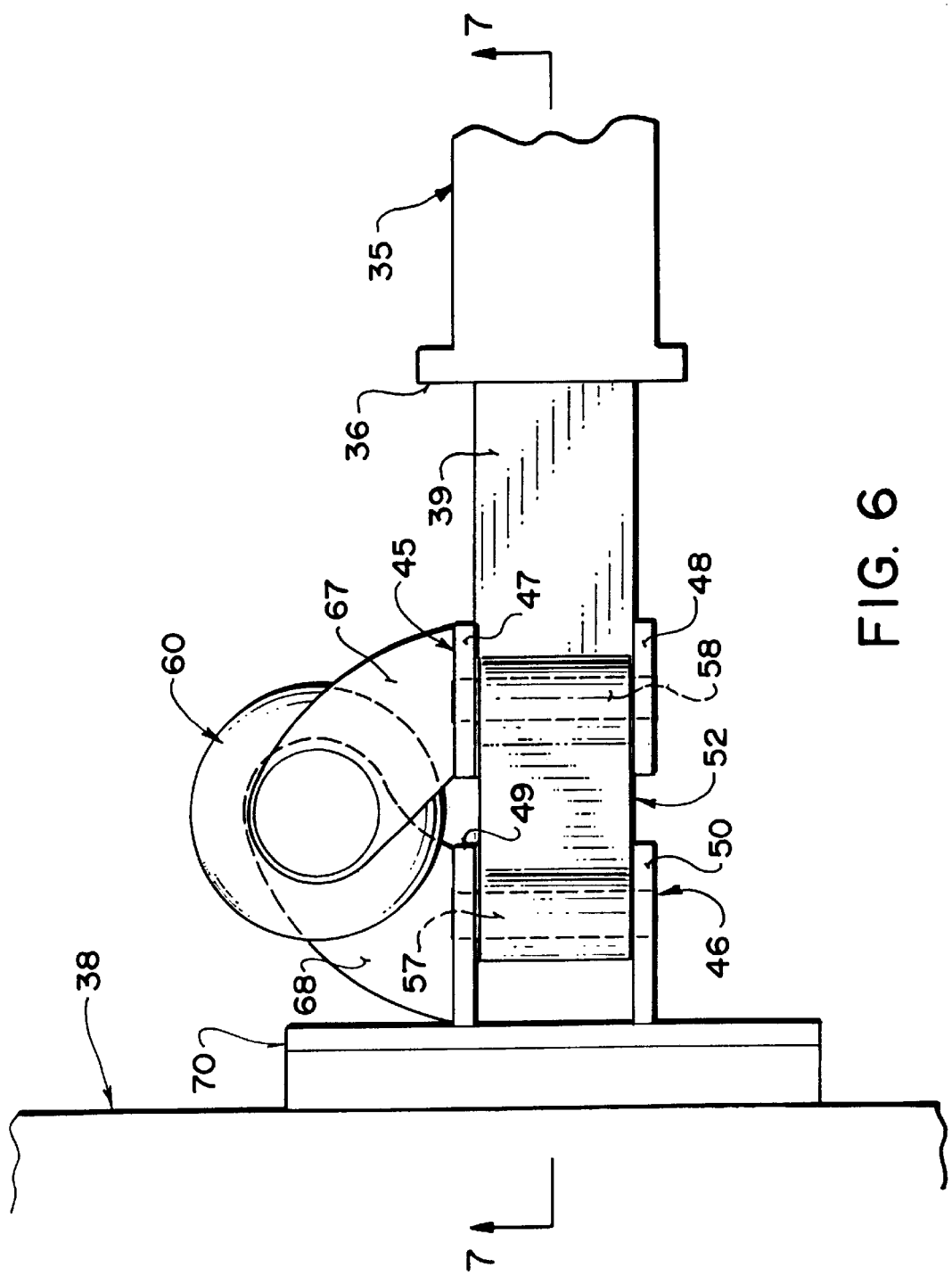
FIG. 6 is a top plan view of one rear suspension assembly of the vehicle of FIG. 1.
Figure 7:
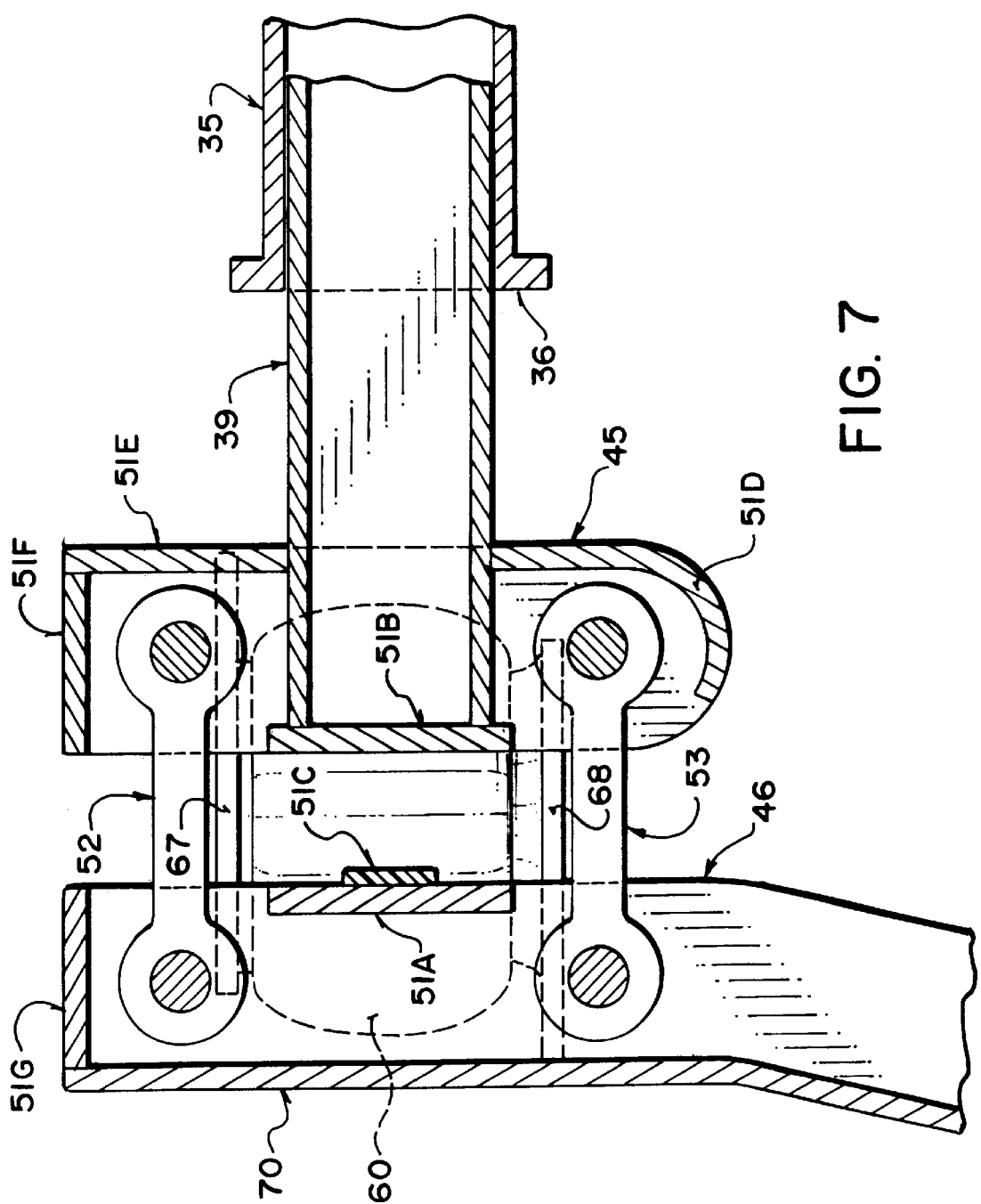
FIG. 7 is a cross sectional view along the lines 7—7 of FIG. 6.

Similarly the rear suspension assemblies are identical and one of them is shown in FIGS. 6 and 7. The front and rear suspension assemblies are of a similar construction such that each comprises a first channel member 45 rigidly attached to the end of the extension beam portion 39. Each suspension further includes a second channel member 46 parallel to the first and spaced outwardly therefrom. Each of the channel members extends generally at right angles to the length of the axle.

Each of the channel members is defined by two side walls so that the channel member 45 is defined by side walls 47 and 48 and the channel member 46 is defined by side walls 49 and 50. The side walls are equidistantly spaced. The side walls are rigid and are maintained in rigid parallel arrangement by transverse connecting walls. The connecting walls include center facing walls 51A and 51B with a rubber stop 51C at the center of one to prevent steel on steel impact when the suspension moves to extreme ends. The wall 51B acts as a closure for the end of the tube 39. A bottom cap 51D extends downwardly from the tube 39 at the bottom of the plates. A top plate 51E extends vertically upwardly centrally of the side walls. In FIG. 7 similar connecting walls are provided but also including top caps 51F and 51G.

The channel member 45 is connected to the channel member 46 by two interconnecting links 52 and 53. Each link comprises two collars 54 and 55 and a connecting bar 56. Each of the collars 54 and 55 is mounted on a mounting pin 57 and 58 respectively. Each of the pins 57 and 58 extends through the channel member so as to be supported by the side walls of the respective channel member. Each of the collars is a sliding fit on the pin so as to rotate around the axis of the pin in the pivotal action of the link. Suitable bearings, bushings or grease nipples are provided in order to maintain a smooth unrestricted pivotal movement of the link relative to the respective channel member.

The width of the collars and the width of the bar are all substantially equal to the spacing between the inside surfaces of the side walls of the channel member so that the side edges of the link form a sliding fit on the respective inside surface of the channel member. Thus the channel members are held each spaced from the other by the parallel links but the channel members can move relatively in a longitudinal direction by parallel pivotal movement of the links. The structure is rigid due to the relatively wide links which fit tightly between the channel members thus holding the structure against twisting about an axis longitudinal of the axle or about a vertical axis. Thus the two channel members are maintained directly parallel with the outside channel member 46 vertical or substantially vertical and maintained at a constant angle while it moves vertically relative to the inner channel member 45 and the axle.

In the above respect, the front and rear suspensions are identical. In addition each suspension includes a gas bag spring 60 which provides a spring suspension between the inner and outer channel members. Thus as the outer channel member 46 moves upwardly, it does so against the bias of the spring thus compressing the gas bag spring 60 which thus resists the vertical movement of the outer channel member.

In the front suspension shown in FIGS. 3, 4 and 5, the gas bag spring 60 is mounted between a top plate 61 on top of the outer channel member 46 and a plate 62 which faces downwardly and is carried on the inner channel member 45. The plate 62 is attached to an overhanging section 63 extending upwardly from the top of the inner channel member 45 and extending over the space between the two channel members to a position overlying the top plate 61 of the channel member 46. A recessed section 64 of the overhanging portion 63 leaves space for the gas bag spring by recessing the front edge 65 of the channel member away from the gas bag spring. The overhanging section 63 is formed by extension portions of the two side walls together with interconnecting walls which hold the structure rigid.

In the rear suspension shown in FIGS. 6 and 7, the gas bag spring 60 is mounted between a plate 67 extending at right angles to the side wall 47 and a bottom plate 68 extending at right angles to the side wall 49. The plates 67 and 68 project outwardly from one side of the channel members and also project at an inclined angle so as to bridge the space between the channel members so the gas bag spring lies on a plane between the two channel members and to one side this is the front or rear of the two channel members. Thus the plate 67 is on top of the gas bag spring and the plate 68 is underneath the gas bag spring so that upward movement of the outer channel member 46 causes compression of the gas bag spring between the plates 67 and 68.

In FIGS. 6 and 7 there is shown a single gas bag spring to the front side of the axle 16 but it will of course be appreciated that there can be two such gas bag springs one in the front and one to the rear in a symmetrical construction.

In both the front and rear suspensions, therefore, with the axle held stationary, the outer channel member can move upwardly and downwardly in a suspension movement while the outer channel member remains vertical and parallel to the inner channel member. The amount of movement between maximum raised and maximum lowered positions to limited by the space between the channel members so that the channel members have their inside edges closely adjacent at the top position and at the bottom position and in the maximum spacing at a central position. Rubber stoppers can be provided to prevent impact between the channel members in the extreme positions.

In a practical example, the total suspension movement can be of the order of eight inches so that there is upward movement of the order of four inches and downward movement of the order of four inches from the central position as shown in the figures which is a normal ride position. As is well known the pressure inside the gas bag spring can be adjusted in accordance with the load so as to maintain the vehicle in the central position as shown when moving over flat terrain so that any changes in the terrain cause the outer channel member to move upwardly or downwardly as required while the axle remains substantially at a level position.

It will be appreciated that in addition to the upward and downward movement of the outer channel member, the outer channel member also moves horizontally due to the pivotal movement of the links about the respective pin on the inner channel member so that the outer channel member moves in an arc. This inward and outward movement tends to distort the gas bag spring in a sideways direction but such springs are designed to accommodate sideways movements of this amount while maintaining a spring force proportional to the amount of compression. The side to side movement is present because the links are substantially of the same length as opposed to similar parallel link systems designed for automobiles where the top link is very much shorter exactly to prevent such inward and outward movements which cannot be accommodated in automobile suspensions.

In addition, the side to side movement of the outer channel member carries with it side to side movement of the wheel relative to the ground. The amount of movement in a practical example is of the order of 0.5 inches during normal operation up to a maximum of 1.25 inches on a maximum shock. As these distances are relatively small and occur very rapidly, the contact point of the tire on the ground generally does not move inwardly and outwardly in response to the suspension movements but instead the movement is taken up in flexing of the large agricultural tire. This flexing acts as a shock absorber for the suspension system. No other shock absorber is therefore required and the sole spring action can be provided by the gas bag spring which has no shock absorbing effect. Despite the absence of a specifically provided shock absorber, the system absorbs shock loading caused by changes in terrain without significant rebound thus rapidly damping the shock loading without allowing oscillation or translation of loading from one axle to the other.

The rear suspension assemblies are connected to the wheel simply by a plate 70 which is welded onto the outside edges of the side walls 49 and 50 of the outer channel member. The plate extends from the channel member downwardly to support the hub of the wheel 38 in a conventional mounting manner for the wheel.

In order that the front suspension also provides a steering action of the front heels, as best shown in FIG. 4, the, channel member is connected by two parallel horizontal plates 71 and 72 underneath the bottom link 53 with those plates carrying a fixed shaft 73 which carries a bearing block 74 which is welded to a horizontal plate 75 and thus provides swivel movement of the plate 75 about a vertical axis centrally of and at right angles to the plates 71 and 72. The plate 75 is thus mounted underneath the vertical outer channel member and lies in a horizontal plane for swivel movement about the vertical steering axis 76 defined by the bearing block 74. An outer edge 78 of the plate 75 is welded to a depending plate 79 corresponding to the plate 70 and carrying the hub 80 of the front wheel 38.

Steering movement is effected by a cylinder 81 having a piston 82 attached to a piston rod 83. The rear end of the cylinder is connected to a support link 84 carried on a fixed arm 85. The arm 85 as best shown in FIG. 5 is attached to an outer rear face of the channel member 46 and extends therefrom parallel to the axle 15 at a position generally rearward of the axle 15. The arm 85 is attached approximately halfway up the channel member 46 between the pins 57. As the arm 85 is attached to the channel member 46, the arm moves upwardly and downwardly in suspension movement with the wheel. The cylinder 81 is carried underneath the arm and extends from the bracket 84 to an actuating arm 86 which is attached to the plate 75 and it stands upwardly therefrom. The arm 86 includes a swivel mounting 87 which is attached to the end of the piston rod 83 so that the collar at the end of the piston rod swivels relative to plate 75 as the plate 75 and the wheel carried thereby swivels about the axis 76 of the bearing block 74.

Figure 8:
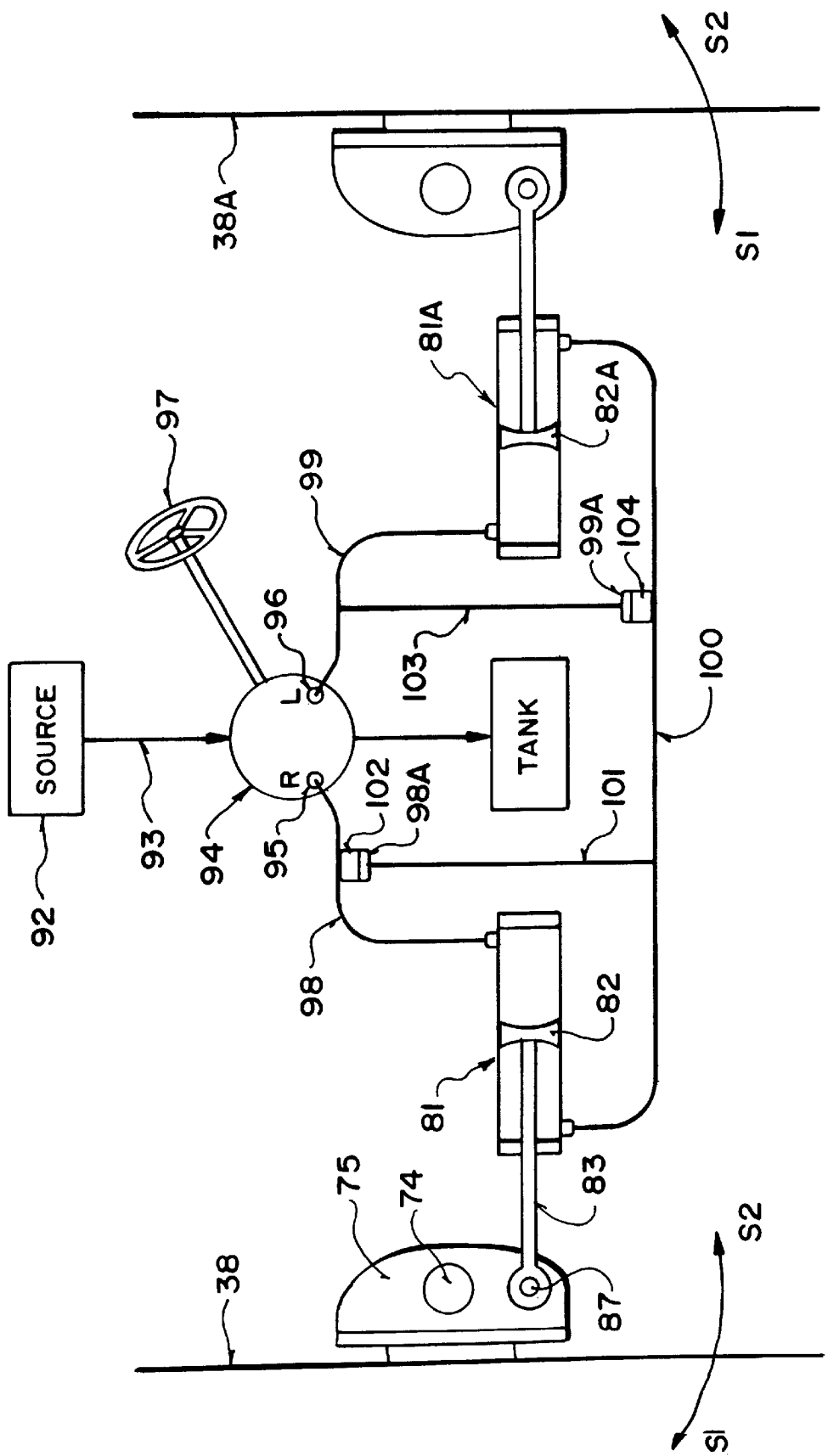
FIG. 8 is a schematic plan view of the steering assembly of the vehicle of FIG. 1.

Turning now to FIG. 8, the cylinder 81 is shown on the left hand side operating movement of the left hand wheel on its bearing block 74. A symmetrical steering arrangement is provided on the opposite side actuated by a cylinder 81A which drives movement of the right front wheel 38A. The cylinder 38A includes a piston 82A and the pistons 82 and 82A are generally central in the respective cylinder when the wheels are aligned in a straight ahead direction. The wheels 38 38A are moveable in a steering action between positions S1 and S2 as shown schematically where position S1 of the wheels is a position of maximum right turn and the position S2 is a position of maximum left turn. The design and arrangement of the angle of the cylinder and the angle of the arm 86 is selected so that the steering movements of the wheels are slightly different in the left and right turn directions to provide the proper steering angles for the wheels to prevent tire scrub.

The circuit for supplying hydraulic fluid to the cylinders is shown schematically and includes a pressure source 92 supplying hydraulic fluid under a predetermined pressure through a line 93 to a steering valve 94 which operates to supply the fluid to right and left ports 95, 96 depending upon movement of a steering input arrangement 97 generally a steering wheel operable by the driver. Fluid from the ports 95 and 96 is communicated through respective lines 98, 99 to one end port of respective ones of the cylinders 81 and 81A. The duct 98 forms a right turn duct and the duct 99 forms a left turn duct. An interconnection duct 100 connects the opposite end of each of the cylinders to the opposite end of the other cylinder.

In this way supply of fluid from the source through the valve 94 to the right turn duct 98 causes fluid to enter the right hand side of the cylinder 81 and to move the left hand wheel 38 to turn to the right. Fluid is forced from the left hand side of the cylinder 81 through the interconnection duct 100 to the right hand side of the cylinder 81A thus moving the piston 82A to the left and causing right hand steering movement of the wheel 38A. Fluid from the left hand side of the cylinder 81A is forced through the left turn duct to the valve 94. A drain or tank is provided to define a low pressure location for supplying the source defined by a suitable pump.

Left turn operation caries out movements in the symmetrically opposed directions and is to be readily apparent.

Assuming that there is no leakage of fluid across the pistons, the wheels remain aligned and the pistons reach the ends of the respective cylinder at the same time thus defining the end positions S1 and S2. However this assumes that there is no leakage of fluid which can be reduced but can not be eliminated.

In order to automatically compensate for any fluid leakage across the pistons, there is provided a first compensation duct 101 between the interconnection duct and a high pressure point in the system which is either the left turn duct or the right turn duct. A first pressure relief valve 102 is provided between the right turn duct and the interconnection duct. The first pressure relief valve 102 is arranged to prevent fluid flow from the interconnection duct 100 to the right turn duct and to allow fluid communication from the right turn duct 98 in the event that the pressure difference therebetween exceeds a predetermined pressure difference higher than normal operating pressure but below the maximum pressure of the source. An orifice 98A is provided in the first compensation duct to ensure that any fluid flow is very slow to avoid transfer of any significant quantity of fluid under shock loading.

A second compensation duct 103. between the interconnection duct and a low pressure point in the system. A second pressure relief valve 104 is provided between the right turn duct and the interconnection duct. The second pressure relief valve 104 is arranged to prevent fluid flow to the interconnection duct 100 from the low pressure point and to allow fluid communication from the interconnection duct 98 in the event that the pressure difference therebetween exceeds a predetermined pressure difference higher than normal operating pressure but below the maximum pressure of the source. An orifice 99A is provided in the second compensation duct to ensure that any fluid flow is very slow to avoid transfer of any significant quantity of fluid under shock loading.

The low pressure point can be the tank 101, the line 98 or 99 when those lines are at low pressure or even can be the adjacent line 99 when it is at high pressure since the pressure is higher in the interconnection line than in the left turn line when turning left since the piston area of the piston 82A is larger on the left than on the right due to the presence of the rod on the right.

In the event that leakage occurs across the pistons so that there is excess fluid on the pressure side opposite the interconnection duct, in the event of a right hand turn in the arrangement as shown fluid flowing to the right hand duct 98 forces the piston 82 to its outer end causing a right hand turn of the wheel 38. Fluid is thus forced through the interconnection duct 100 and drives the piston 82A towards its inner end thus expelling fluid through the left turn duct. As there is less fluid on the interconnection duct side, the piston 82 reaches its end at the outer end of the cylinder before the piston 82A reaches its end at the inner end of the cylinder. However as the piston 82 can move no further, a pressure differential develops across the pressure relief valve 102 so that fluid bypasses through the valve 102 from the right turn duct into the interconnection duct allowing the piston 82A to move to its end position.

Vice versa, in the event that leakage occurs across the pistons so that there is less fluid on the pressure side and excess fluid in the interconnection duct, in the event of a left hand turn in the arrangement as shown fluid flowing to the left hand duct 98 forces the piston 82A to its outer end causing a left hand turn of the wheel 38. Fluid is thus forced through the interconnection duct 100 and drives the piston 82 towards its inner end thus expelling fluid through the right turn duct. As there is excess fluid on the interconnection duct side, the piston 82 reaches its end at the inner end of the cylinder before the piston 82A reaches its end at the outer end of the cylinder. However as the piston 82 can move no further, a pressure differential develops across the pressure relief valve 104 so that fluid bypasses through the valve 104 from the interconnection duct into the low pressure point of the system allowing the piston 82A to move to its end position.

The safety of the system can be enhanced by allowing the pressure relief valves to operate only in a situation where the pistons are at an end position thus preventing transfer of fluid during normal operation under shock loads or at other unintentional times. This is effected by mounting the pressure relief valves on the cylinder and by using the position of the piston within the cylinder to drive operation of the pressure relief valves.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. An agricultural vehicle for moving over agricultural terrain comprising:

a vehicle frame structure for supporting elements to be transported;

a pair of ground wheels each having a wheel hub mounted on a respective side of the frame structure for rotation of the ground wheel about the wheel hub for transporting the frame structure across the ground in a direction of travel;

two suspension assemblies each for supporting a respective side of the frame structure on a respective one of the wheel hubs for suspension movement of the frame structure in a suspension direction generally upwardly and downwardly relative to the respective hub in response to changes in ground level;

each suspension assembly comprising:

a first member carried on the respective side of the frame structure;

a second member attached to the respective hub;

a pair of pivotal links interconnecting the first and second members to allow generally up and down suspension movement of the second member relative to the first member;

the second member being mounted outwardly of the first member such that the pivotal links extend outwardly from the first member to the second member and such that the first member, the second member and the links all lie generally in a common vertical plane at right angles to the direction of travel;

the second member comprising a substantially vertical leg extending downwardly from an upper end at the pivotal links to a lower end at the hub so that the hub is located downwardly of the frame structure;

one of the pivotal links being mounted above the other;

each of the pivotal links being mounted on the first member for pivotal movement relative thereto about a respective pivot axis parallel to the direction of travel and each of the pivotal links being mounted on the second member for pivotal movement relative thereto about a respective pivot axis parallel to the direction of travel;

and a spring connected between the first and second member so as to generate a spring bias in a direction along the suspension direction to support the respective side of the frame structure on the respective hub.

2. The vehicle according to claim 1 wherein the spring is a gas bag.

3. The vehicle according to claim 2 wherein the pivotal links are dimensioned and arranged such that, in addition to the generally up and down suspension movement, they also generate inward and outward movement of the second member relative to the first member.

4. The vehicle according to claim 2 wherein each of the first and second members carries a substantially horizontal platform with the gas bag spring located between the platforms.

5. The vehicle according to claim 1 wherein the links are pivotal from a raised position of the wheel in which the links are inclined outwardly of the first member and upwardly, through a horizontal orientation to a lowered position of the wheel in which the links are inclined outwardly and downwardly.

6. The vehicle according to claim 1 wherein the links are substantially parallel.

7. The vehicle according to claim 1 wherein the links are substantially of the same length and arranged such that said pivot axes thereof on the first member lie in a common vertical first plane and such that said pivot axes thereof on the second member lie in a common vertical second plane parallel to the first plane.

8. The vehicle according to claim 1 wherein the first member includes two parallel side mounting plates each lying in a vertical plane at right angles to the direction of travel and a pair of vertically spaced horizontal pins carried by the side mounting plates at right angles thereto, each pin defining a respective pivot mounting for a respective end of a respective one of the links; wherein the second member comprises a generally vertically extending channel member to which the hub is attached defining a back plate and two parallel side mounting plates each lying in a vertical plane at right angles to the direction of travel and a pair of vertically spaced horizontal pins carried by the side mounting plates at right angles thereto, each pin defining a respective pivot mounting for a respective end of a respective one of the links; and wherein each link includes two end collars and a connecting bar therebetween, each collar being mounted on a respective one of the pins so that an axis of the collar is maintained coincident with an axis of the pin to define said pivot axis, and each collar being confined against forward and rearward movement in the direction of travel by the side mounting plates so that the links hold the second member in said common vertical plane.

9. The vehicle according to claim 1 wherein the frame structure includes a transverse axle member and wherein the first member is mounted on an outer end of the transverse axle member.

10. The vehicle according to claim 9 wherein the transverse axle member is extendible to increase and decrease the spacing between the wheels.

11. The vehicle according to claim 1 wherein the frame structure includes:
- a front frame portion and a rear frame portion, each of the frame portions being substantially rigid and the frame portions being connected so as to be maintained aligned in the direction of travel and so as to prevent steering pivotal movement between the frame portions about a vertical axis;
- a front transverse axle member mounted on the front frame portion and extending across the front frame portion;
- a rear transverse axle member mounted on the rear frame portion and extending across the rear frame portion rearwardly of the front transverse axle member;
- each of the front and rear transverse axle members having a pair of ground wheels thereon, each ground wheel having a wheel hub mounted at a respective end of the transverse axle member on a respective side of the frame structure for rotation of a wheel about the wheel hub for transporting the frame structure across the ground;
- the ground wheels of at least the front frame portion being steerable;
- the front and rear frame portions being mounted for pivotal movement each relative to the other about an axis longitudinal of the direction of travel:
- each of the ground wheels being mounted on a respective end of a respective one of the transverse axle members by a respective one of the suspension assemblies arranged to allow suspension movement of the axle in a suspension direction generally upwardly and downwardly relative to the respective ground wheel in response to changes in ground level.

12. The vehicle according to claim 11 wherein the vehicle includes an engine and a cab mounted wholly on the front frame portion and includes a load mounted wholly on the rear frame portion.

13. The vehicle according to claim 11 wherein there is provided a limit stop for limiting said pivotal movement of said frame portions.

14. An agricultural vehicle for moving over agricultural terrain comprising:
- a vehicle frame structure for supporting elements to be transported;
- a pair of ground wheels each having a wheel hub mounted on a respective side of the frame structure for rotation of the ground wheel about the wheel hub for transporting the frame structure across the ground in a direction of travel;
- two suspension assemblies each for supporting a respective side of the frame structure on a respective one of the wheel hubs for suspension movement of the frame structure in a suspension direction generally upwardly and downwardly relative to the respective hub in response to changes in ground level;
- each suspension assembly comprising:
  - a first member carried on the respective side of the frame structure;
  - a second member attached to the respective hub;
  - a pair of pivotal links interconnecting the first and second members to allow generally up and down suspension movement of the second member relative to the first member;
  - the second member being mounted outwardly of the first member such that the pivotal links extend outwardly from the first member to the second member and such that the first member, the second member and the links all lie generally in a common vertical plane at right angles to the direction of travel;
  - one of the pivotal links being mounted above the other;
  - each of the pivotal links being mounted on the first member for pivotal movement relative thereto about a respective pivot axis parallel to the direction of travel and each of the pivotal links being mounted on the second member for pivotal movement relative thereto about a respective pivot axis parallel to the direction of travel
  - and a spring connected between the first and second member so as to generate a spring bias in a direction along the suspension direction to support the respective side of the frame structure on the respective hub;
  - the first member including two parallel side mounting plates each lying in a vertical plane at right angles to the direction of travel and a pair of vertically spaced horizontal pins carried by the side mounting plates at right angles thereto, each pin defining a respective pivot mounting for a respective end of a respective one of the links;
  - the second member comprising a generally vertically extending channel member to which the hub is attached defining a back plate and two parallel side mounting plates each lying in a vertical plane at right angles to the direction of travel and a pair of vertically spaced horizontal pins carried by the side mounting plates at right angles thereto, each pin defining a respective pivot mounting for a respective end of a respective one of the links;
  - each link including two end collars and a connecting bar therebetween, each collar being mounted on a respective one of the pins so that an axis of the collar is maintained coincident with an axis of the pin to define said pivot axis, and each collar being confined against forward and rearward movement in the direction of travel by the side mounting plates so that the links hold the second member in said common vertical plane.

15. The vehicle according to claim 14 wherein the frame structure includes a transverse axle member and wherein the first member is mounted on an outer end of the transverse axle member.

16. The vehicle according to claim 15 wherein the transverse axle member is extendible to increase and decrease the spacing between the wheels.

17. The vehicle according to claim 14 wherein the frame structure includes:
- a front frame portion and a rear frame portion, each of the frame portions being substantially rigid and the frame portions being connected so as to be maintained aligned in the direction of travel and so as to prevent steering pivotal movement between the frame portions about a vertical axis;
- a front transverse axle member mounted on the front frame portion and extending across the front frame portion;
- a rear transverse axle member mounted on the rear frame portion and extending across the rear frame portion rearwardly of the front transverse axle member;
- each of the front and rear transverse axle members having a pair of ground wheels thereon, each ground wheel having a wheel hub mounted at a respective end of the transverse axle member on a respective side of the frame structure for rotation of a wheel about the wheel hub for transporting the frame structure across the ground;
- the ground wheels of at least the front frame portion being steerable;
- the front and rear frame portions being mounted for pivotal movement each relative to the other about an axis longitudinal of the direction of travel;
- each of the ground wheels being mounted on a respective end of a respective one of the transverse axle members by a respective one of the suspension assemblies arranged to allow suspension movement of the axle in a suspension direction generally upwardly and downwardly relative to the respective ground wheel in response to changes in ground level.

18. An agricultural vehicle for moving over agricultural terrain comprising:
- a vehicle frame structure for supporting elements to be transported;
- the frame structure including at each side an outwardly extending axle member having an outer end;
- each axle member being extendible to increase and decrease the spacing between the outer ends;
- a pair of ground wheels each having a wheel hub at a respective side of the frame structure for rotation of the ground wheel about the wheel hub for transporting the frame structure across the ground in a direction of travel;
- two suspension assemblies each for supporting a respective side of the frame structure on a respective one of the wheel hubs for suspension movement of the frame structure in a suspension direction generally upwardly and downwardly relative to the respective hub in response to changes in ground level;
- each suspension assembly comprising:
  - a first member carried on an outer end of a respective one of the axle members;
  - a second member attached to the respective hub;
  - a pair of pivotal links interconnecting the first and second members to allow generally up and down suspension movement of the second member relative to the first member;
  - the second member being mounted outwardly of the first member such that the pivotal links extend outwardly from the first member to the second member and such that the first member, the second member and the links all lie generally In a common vertical plane at right angles to the direction of travel;
  - one of the pivotal links being mounted above the other;
  - each of the pivotal links being mounted on the first member for pivotal movement relative thereto about a respective pivot axis parallel to the direction of travel and each of the pivotal links being mounted on the second member for pivotal movement relative thereto about a respective pivot axis parallel to the direction of travel
  - and a spring connected between the first and second member so as to generate a spring bias in a direction along the suspension direction to support the respective side of the frame structure on the respective hub.

* * * * *